July 15, 1969   P. HINI   3,456,097
REVOLUTION COUNTER
Filed Oct. 1, 1965

United States Patent Office 3,456,097
Patented July 15, 1969

3,456,097
REVOLUTION COUNTER
Paul Hini, Erlangen, Germany, assignor to Siemens Aktiengesellschaft, Erlangen, Germany, a corporation of Germany
Filed Oct. 1, 1965, Ser. No. 492,095
Claims priority, application Germany, Oct. 3, 1964, S 93,615
Int. Cl. G06f 7/385
U.S. Cl. 235—92                 7 Claims

ABSTRACT OF THE DISCLOSURE

Revolution counter includes in combination, a pair of diametrically opposed spaced pole shoes excited by a permanent magnet, each of the pole shoes comprising longitudinal sections of a hollow cylinder, gear wheel means positioned in the arcuate gap defined by the pole shoes and disposed to be rotated about the longitudinal axis of the cylinder, the gear wheel means comprising a plurality of radially disposed gears, galvanomagnetic semiconductor field plate means on the inner cylindrical surface of at least one of the pole shoes, the gear wheel means comprising a soft magnetic material whereby a magnetic circuit is completed between the pole shoes through the gear wheel and whereby, upon the supplying of current to the field plate means and the rotation of the gear wheel means, the galvanomagnetic resistance of the field plate means varies in accordance with the amount of its surface traversed by a gear.

SPECIFICATION

My invention relates to galvanomagnetic semiconductor devices. More particularly, it relates to an arrangement employing such device for effecting a revolution count, an example of such device being an r.p.m. counter or indicator.

Galvanomagnetic semiconductor field plates, which may generally be described as devices which comprise at least a semiconductor layer and which exhibit a resistance characteristic in magnetic field, have found much practicable application as resistors because of their possessing such characteristic. Thus, galvanomagnetic semiconductor field plates have been respectively disposed in the air gaps between the pole shoes of magnets to produce contact free resistors. Since the values of the resistance of such plates varies with the magnitude of the magnetic field applied thereto, such galvanomagnetic semiconductor resistors have readily lent themselves to use as variable resistors and potentiometers, the electrical resistance of a field plate varying directly with its degree of containment within the magnetic field, i.e., resistance is at a maximum when the field plate is located entirely within the magnetic field and may smoothly be reduced to a minimum by commensurately smoothly pulling the plate from the magnetic field.

Galvanomagnetic semiconductor field plates disposed in the air gap of a magnetic circuit between the pole shoes of a magnet have also been used to sense rotation in a shaft.

It is an important object of this invention to utilize the physical principle of the responding to rotation in a shaft by a galvanomagnetic semiconductor field plate located in the air gap of a magnetic circuit to provide a revolution counter suitable for use as an r.p.m. indicator or other like device.

This object is achieved by disposing at least one gear wheel which comprises a soft, i.e., high permeability, magnetic material and which is rotatable about an axis of rotation between the pole shoes of an electromagnet the latter shoes being configured as longitudinal sections of a hollow cylinder. For each gear wheel so disposed, a galvanomagnetic semiconductor field plate is provided on the surface of a pole shoe. The gear wheel or wheels may alternatively comprise, at least in part, a non-magnetic material such as, for example, brass, or may comprise a synthetic material such as a suitable plastic having incorporated therein insertions comprising the aforesaid magnetic material.

The peripheral width of a pole shoe carrying a field plate, i.e., the width along the hollow cylindrical periphery, is suitably chosen to have approximately the same width as that of the field plate. With such arrangement, a magnetic flux concentration is provided in the region of the field plate. In the place of these pole shoes, there may alternatively be utilized two or more separate and similarly configured longitudinal sections of a hollow cylinder which carry galvanomagnetic semiconductor field plates. The peripheral, i.e., angular width of two such pole shoe arms carrying field plates may be, for example, 60, 90 or 180°. Consequently, in appropriate circuits into which the field plates are connected, the signals which may be tapped by these field plates on various pole shoe arms have advantageous appropriate phase displacements with respect to each other. In the simplest example of the inventive arrangement, a permanent type magnet is provided in the magnetic circuit which excites the pole shoes. The field plates may be designed to be double poled, i.e., with electrode terminals at the respective ends thereof, or may include, in addition to the end terminals, a center tap. In the arrangement where the field plate includes merely the end terminals, it is connected in circuit as a variable resistor. Where the field plate also has an intermediate tap thereon, it is inserted into circuit as a potentiometer. Since the field plates in the inventive arrangement are disposed on pole shoes of magnets, i.e., massive bases, which are characterized by good thermal conductivity, they can be subjected to relatively strong electric phenomena.

The gear wheels may be made of solid or lamellar, soft, i.e., high-permeability, magnetic material or ferrite. When a gear wheel is rotated about its axis, the resistance of its associated field plate varies in accordance with the design of the gear wheel in a chosen manner, i.e., in a measuring instrument which is connected in circuit with the field plate, a signal appears which corresponds specifically with the design of the gear wheel.

In an illustrative embodiment of the invention, the gear wheels have planar side surfaces and comprise rectangular gears which are of like shape and which are equispaced from each other. When such gear wheel is rotated, the gears are successively moved across the surface of the field plate disposed between the gear wheel and the pole shoes. If the gears are equispaced from each other, repetitive resistance increases and decreases regularly alternately occur, i.e., electrical signals of respectively the same magnitudes and durations. This embodiment is a type of device in which one or several rigidly connected gear wheels, disposed to be rotatable about a common axis, may, for example, be employed for measuring and counting angles of rotation.

By using several of the same configuration or several of different configuration gear wheels which are firmly disposed on the axis of rotation, the signals produced on the galvanomagnetic semiconductor field plates may be taken therefrom and combined in a desired manner. Thus, as described hereinabove, in an embodiment employing like gear wheels, the produced signals occur synchronously and independently of each other. If the gears are chosen to have various lengths, then signals of correspondingly various time durations are produced when the gear wheel is rotated provided that the gear wheel is rotated at a uniform velocity.

In a second embodiment according to the invention, the rectangular gears of each gear wheel are set off from each other along the direction of the rotation of the gear's axis in a stepped arrangement. This displacement or setting off along the entire periphery of the gear wheel may be chosen to progressively increase in a linear manner, for example, in uniform increments, or nonlinearly, in the axial direction. Consequently, a line connecting the centers of gravity of the peripheral surfaces of the gears is effectively a cylindrical spiral. The aforesaid displacement, in totality, may amount, for example, to almost the width of a gear. The offsetting of the gears may, alternatively, increase only in the axial direction up to a given point and then decrease again, such as with an increase up to 180° and a decrease thereafter. In the latter situation, the gears disposed along the periphery of the gear wheel may be approximately distributed along a sinusoidal line.

The stepped, offset, gears may be disposed against or spaced from each other. In a suitable embodiment, adjacent gears may be angularly spaced from each other a distance substantially equal to the width of a gear.

If the hereinabove described gears, displaced in stepped arrangement, are disposed adjacent to each other, then, the gears of the gear wheel lie directly at the side surface of the gear wheel. The gear wheel then, approximately, has the configuration of a spiral staircase with a winding path which either increases and decreases relatively smoothly and continuously or which increases and then drops abruptly or discontinuously. In another instance, with spaced gears, there results a structure having approximately the shape of a spiral ladder, analogous to the spiral staircase.

In a third embodiment according to the invention, and which may be combined with the second embodiment, the gears may be narrowed or broadened without their center of gravity being shifted from the plane of the gear wheel. In this third embodiment, the pole shoes on which the galvanomagnetic semiconductor field plates are disposed, preferably should be designed to have a greater angular width than the width of pole shoes employed in the aforesaid first and second embodiments respectively. With such larger angular width pole shoes selection, no magnetic flux concentrations can occur in the narrower gears whereby the continuity of the magnetic flux is not interrupted between the pole shoes and the gear wheel.

If the gear wheels all have the same width in the direction of the axis of rotation, the lengths of the field places are generally chosen to be substantially equal to such width. With the employment of a gear wheel which is rotatable in an appropriate plane with respect to the disposition of the field plate and which comprises a spiral staircase or spiral ladder arrangement of gears wherein the total setoff of the gears is equal to about one gear width, there is enabled the achievement upon the rotation of the gear wheel that the gear which extends the furthest from the one side surface of the gear wheel moves directly across an edge of the field plate. The succeeding gears progressively cover respective greater areas of the field plate in stepped increments during the gear wheel rotation, the last gear which extends the furthest from the other side of the gear wheel covering the total area of the field plate in its rotational passage. Consequently, the first mentioned gear produces a quite small and the last mentioned gear produces a quite large resistance change in the galvanomagnetic semiconductor field plate, i.e., correspondingly small and large signals, respectively. Similarly, signals of differing magnitudes may be obtained if the gears along the periphery of the gear wheel are either tapered or flared in the axial direction. In the latter design, the length of the field plate is chosen to be equal to the width of the widest gear.

The revolution counter constructed in accordance with the principles of the invention, may comprise several gear wheels which are arranged to be rotatable about a common axis. These wheels may be freely connected to each other or may be so coupled to each other as to enable their individual discrete rotations, the latter coupling arrangement being suitable for use in a computer or counter, for example. Generally, in a computer or other type calculating device comprising like gear wheels, a rotation of a succeeding wheel corresponds to ten rotations of an immediately preceding wheel. Accordingly, a gear wheel, according to the invention, may have ten live respectively equispaced gears comprising a high permeability, i.e., a soft, magnetic material. In a modification of the latter arrangement, the gears may comprise a nonmagnetic material, a particularly suitable non-magnetic material for this purpose being brass, for example. There also may exist the arrangement where a space may be present on the gear wheel in the place of a nonmagnetic material gear.

Within the contemplation of the invention, the revolution counter may comprise gear wheels with a large number of gears, such as 5000, for example. With the latter construction, the invention is then particularly suitable for use as an indicator of angular steps for linear movements of numerical controls such as for machine tools, for example. The invention is particularly advantageously applied to numerical controls because of its high resolving power and the relatively high signal voltages produced from the revolution counter.

Generally speaking and in accordance with the invention, there is provided in combination, a pair of diametrically opposed spaced pole shoes excited by a magnet, each of the pole shoes comprising longitudinal sections of a hollow cylinder. Gear wheel means are positioned in the arcuate gap defined by the pole shoes so disposed as to be rotated about the longitudinal axis of the hollow cylinder. The gear wheel means suitably is made of a soft magnetic material and comprises a plurality of radially disposed gears.

Galvanomagnetic semiconductor field plate means are provided on the inner cylindrical surface of one of the aforesaid pole shoes. As a result of the foregoing arrangement, a magnetic circuit is completed between the pole shoes through the gear wheel means. Upon the supplying of current to the field plate means and the rotation of the gear wheel means, the galvanomagnetic resistance of the field plate means varies in accordance with the amount of its surface traversed by a gear.

The foregoing and more specific objects of my invention will be apparent from and will be mentioned in the following description of a revolution counter according to the invention taken in conjunction with the accompanying drawing.

Figure 1:
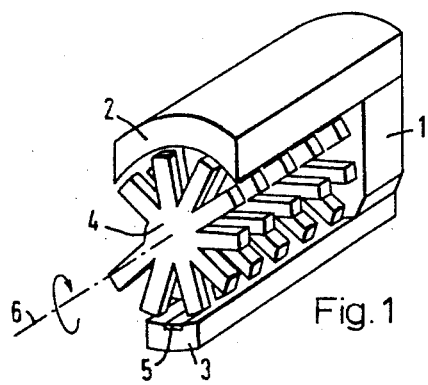
FIG. 1 shows a schematic three-dimensional depiction of an illustrative embodiment of the invention.

Referring now to FIG. 1 wherein there is shown a schematic three-dimensional view of an illustrative embodiment of a revolution counter constructed in accordance with the principles of the invention, a magnet 1 which is suitably of the permanent magnet type has extending from its ends a pair of pole shoes 2 and 3 which are magnetically excited by magnet 1 are configured to be two longitudinal sections of a right circular cylinder. Disposed in a spaced array so as to be rotatable about a common axis of rotation 6 which is also the longitudinal axis of the hollow cylinder between pole shoes 2 and 3 are a plurality of gear wheels 4. The numeral 5 designates a galvanomagnetic semiconductor field plate which, located on the inner hollow cylindrical surface of pole shoe 3 and which is traversed by the gears of the front gear wheel opposing as the latter is rotated. It is noted that the angular width of the gears is about equal to the width of field plates. Field plates 5 are respectively disposed on pole shoe 3 in opposition to each of the gear wheels. Gear wheels 4 suitably comprise a soft magnetic material. The gear wheels may be rigidly connected to each other or coupled such that a rotation of a successively occurring wheel corresponds to a chosen number greater than one, of rotations of the immediately preceding gear wheel.

Figure 2A:
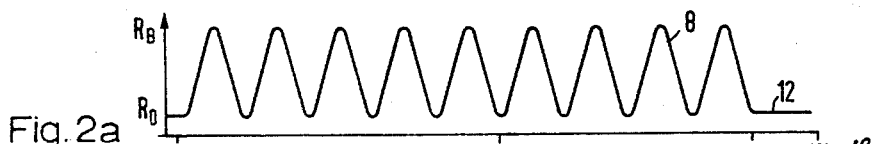
FIGS. 2a, 3a and 4a are curves which show the dependence of the resistance of the galvanomagnetic semiconductor field plate upon the angle of rotation of three types of gear wheels respectively, in accordance with the invention.
Figure 3A:
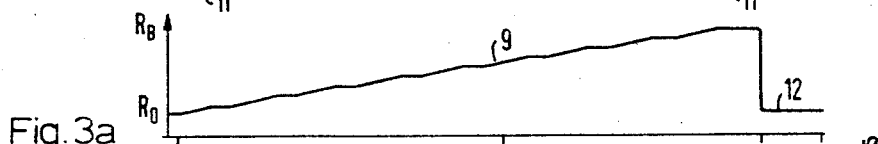
Figure 4A:
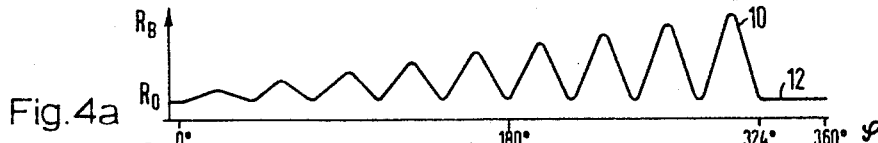

The curves 8, 9 and 10 in FIGS. 2a, 3a, and 4a respectively represent the resistance change of a dependence of a field plate upon the angle of rotation $\varphi$ of a gear wheel traversing a field plate. The abscissas of these curves represent angle of rotation (from 0 to 360°) and the ordinates represent the resistance R of the field plate. The notation $R_0$ designates the ground resistance of a field plate and the notation $R_B$ represents the maximum galvanomagnetic resistance of the field plate in the revolution counter constructed in accordance with the principles of the invention.

Figure 2B:
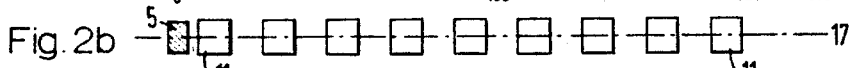
FIGS. 2b, 3b and 4b are depictions of the relative dispositions of the gears of the aforementioned three gear wheels respectively with respect to the field plate and the plane of the gear wheel.
Figure 3B:
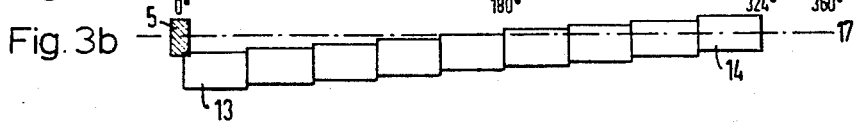
Figure 4B:
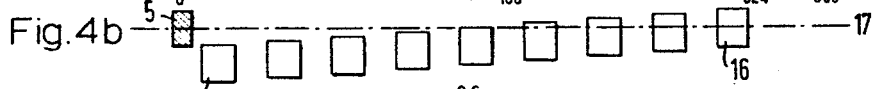

FIGS. 2b, 3b and 4b depict three different types of gear wheels and shows the respective positions of the end surfaces of their gears as they attain the same plane, i.e., the plane of the drawing. The numeral 5 in each of FIGS. 2b, 3b and 4b designates the field plate associated with a wheel, the broken lines 17 in each of these figures respectively indicating the gear wheel plane. Each of the gear wheels, similar to gear wheels 4 in FIG. 1, have nine gears and an empty space which corresponds to a gear. Plane 17 is, of course, perpendicular to the axis of rotation.

Referring to FIG. 2, it is seen that where the like gears 11 of the gear wheel are coplanarly disposed in equispaced relationship as shown in FIG. 2b, the resistance of field plates periodically symmetrically increases to a live maximum as each gear traverses the surface of field plate 5 and then decreases correspondingly symmetrically to a live minimum as shown in curve 8 in FIG. 3b, are uniform in dimension but are disposed directly next to each other and are shifted in equal stepped increments in the axial direction with respect to each other with relation to plane 17. The end surface of the first gear 13 in this wheel covers only a very slight portion of the opposite surface of field plates during the rotation of the gear wheel, whereas the last gear 14 traverses substantially the whole surface of field plate 5 during rotation of the gear wheel. Thus, as the gear wheel of FIG. 3b rotates, whereby the gears 13 through 14 traverse the surface of field plate 5, the resistance of plate 5 progressively increases in a relatively linear fashion as depicted in curve 9 of FIG. 3a up to a maximum at an angle of rotation of 324°, after at which point, it drops abruptly to the ground resistance value $R_0$. The plateaus 12 in the resistance curves of FIGS. 2a, 3a and 4a, whose abscissal length corresponds to 36° of arc, i.e., the angular width of the empty space on a gear wheel, occur at ground resistance $R_0$. Such plateau would also occur in the resistance curves if a gear of a nonmagnetic material were to be approximately inserted into the empty space in the gear wheel.

Figure 6:
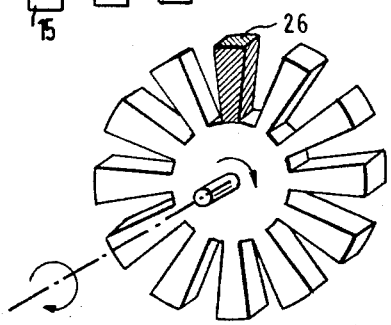
FIG. 6 is a three-dimensional view of a gear wheel which includes a nonmagnetic material gear.

FIG. 6 is a three-dimensional depiction of a gear wheel 25 having ten gears, nine of these gears comprising the soft magnetic material constituting the gear wheel, the other and tenth gear 26 comprising a suitable nonmagnetic material such as brass. It is, of course, appreciated that if a tenth gear of a magnetic material were included in the gear wheels of FIGS. 2b and 3b, curve 8 would include a tenth crest in the abscissal length between 324 and 360° and curve 9 would also continue to the 360° abscissal point, the height of curve 9 in the last-mentioned abscissal length thereby being dependent upon the disposition of the tenth gear with respect to plane 17 and field plate 5.

The arrangement of FIG. 4b is the resultant of the combination of the arrangements of FIGS. 2b and 3b and the curve of 4a is the resistance curve of plate 5 with the gear arrangement of FIG. 4b. In the arrangement of FIG. 4b, the gears are of uniform dimension, are equispaced from each other, and are progressively shifted with respect to each other in rotation to plane 17 in like increments along the axial direction. Thus, when the gear wheel comprising the gears of the arrangement of FIG. 4b is rotated, the first gear 15 causes only a small change in the resistance of field plate 5 and, as the wheel rotates for a cycle, the resistance of field plate 5 rises to a maximum as gear 16 traverses plate 5. Because of the equal spacing between the gears in FIG. 4b, each tenth of a cycle shows a crest having symmetrically occurring leading and trailing edges, the apices of the crests lying along a line which substantially increases linearly to the maximum at the midpoint of the ninth tenth of the rotational cycle, the minimum points occurring at ground resistance $R_0$.

Figure 5:
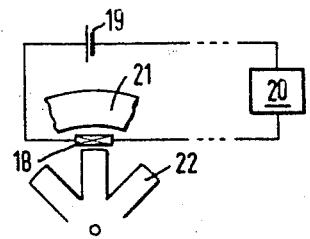
FIG. 5 is a schematic diagram of a counting circuit employing the invention.

In FIG. 5 wherein there is shown a schematic depiction of an electrical circuit in which the arrangement according to the invention is advantageously utilized, the galvanomagnetic semiconductor field plate is connected in circuit with a voltage source 19 and an electrically actuated counter 20 which may suitably be located on an instrument panel. Field plate 18 is located in the magnetic circuit provided by a magnetically excited cylindrical section contoured pole shoe and a gear wheel 22 comprised of a soft magnetic material, the magnetic circuit arrangement being as described hereinabove. It is seen that as gear wheel 22 is caused to be rotated, signals successively generated in response to the periodic changes in resistance in field plate 18 are employed to correspondingly successively trip counter 20.

The semiconductor body of the field plate advantageously should have the strongest possible galvanomagnetic resistance characteristics. Suitable semiconductor materials therefor are those made of $A^{III}B^V$ materials wherein A and B are elements of groups III and V, respectively, of the periodic table of elements, examples of such materials being indium antimonide or indium arsenide. It has been found that a particularly strong galvanomagnetic dependence is achieved if needleshaped anisotropic inclusions are included in the semiconductor body and are aligned therein in substantially spaced parallel disposition and substantially perpendicular to the direction of the passage of current through the galvanomagnetic semiconductor field plate. These anisotropic inclusions comprise a material which is of relatively good electrical conductivity as compared to the electrical conductivity of the semiconductor material. Suitable examples of an inclusions material are a conductive metal, or a second phase of a quasi-binary phase such as the combination of nickel antimonide inclusions in indium antimonide semiconductor material.

It will be obvious to those skilled in the art upon studying this disclosure that revolution counters according to my invention permit of a great variety of modifications and hence can be given embodiments other than those particularly illustrated and described herein without departing from the essential features of my invention and within the scope of the claims annexed hereto.

I claim:

1. Revolution counter comprising in combination, a pair of diametrically opposed spaced pole shoes excited by a permanent magnet, each of said pole shoes comprising longitudinal sections of a hollow cylinder, gear wheel means positioned in the arcuate gap defined by said pole shoes and disposed to be rotated about the longitudinal axis of said cylinder, said gear wheel means comprising a plurality of radially disposed gears, galvanomagnetic semiconductor field plate means on the inner cylindrical surface of at least one of said pole shoes, said gear wheel means comprising a soft magnetic material whereby a magnetic circuit is completed between said pole shoes through said gear wheel and whereby, upon the supplying of current to said field plate means and the rotation of said gear wheel means, the galvanomagnetic resistance of said field plate means varies in accordance with the amount of its surface traversed by a gear.

2. In combination as defined in claim 1 wherein said gear wheel means comprises an array of substantially parallel arranged gear wheels disposed along said axis, each of said wheels being disposed to be rotatable around said axis, each of said gear wheels comprising a plurality of radially disposed gears.

3. In combination as defined in claim 1 wherein said gear wheel means comprises at least one gear wheel disposed to be rotatable about said axis, said gear wheel comprising a plurality of radially disposed equispaced uniformly dimensioned gears, each of said gears being substantially coplanarly disposed in the plane of said gear wheel.

4. In combination as defined in claim 1 wherein said gear wheel means comprises at least one gear wheel disposed to be rotatable about said axis, said gear wheel comprising a plurality of radially disposed gears, said gears being respectively offset from each other with relation to the plane of said gear wheel.

5. In combination as defined in claim 1 wherein said gear wheel means comprises at least one gear wheel disposed to be rotatable about said axis, said gear wheel comprising at its periphery $n$ substantially equal angular subdivisions, $n-1$ gears respectively radiating from $n-1$ subdivisions in radial dispositions and an empty space in the remaining subdivision.

6. In combination as defined in claim 1 wherein said gear wheel means comprises at least one gear disposed to be rotatable about said axis, said gear wheel comprising at its periphery $n$ substantially equal subdivisions, $n$ gears substantially respectively radiating from said subdivisions in radial dispositions, at least one of said gears comprising a nonmagnetic material.

7. A revolution counter comprising a magnetic circuit comprising a pair of diametrically opposed spaced pole shoes excited by a permanent magnet, each of said pole shoes comprising longitudinal sections of a hollow cylinder, gear wheel means positioned in the arcuate gap defined by said pole shoes and disposed to be rotated about the longitudinal axis of said cylinder, said gear wheel means comprising a plurality of radially disposed gears, galvanomagnetic semiconductor field plate means on the inner cylindrical surface of at least one of said pole shoes, said gear wheel means comprising a soft magnetic material, an electrically actuable counter in electrical circuit with said field plate means and means for applying a potential to said circuit.

References Cited

UNITED STATES PATENTS

| | | | |
|---|---|---|---|
| 2,614,171 | 10/1952 | Fein | 338—32 X |
| 2,924,633 | 2/1960 | Sichling | 338—32 X |
| 3,194,065 | 7/1965 | Wilson | 235—103.5 X |
| 3,226,711 | 12/1965 | Lautzenhiser | 338—32 X |
| 3,305,717 | 2/1967 | Weiss | 338—32 X |

MAYNARD R. WILBUR, Primary Examiner

GREGORY J. MAIER, Assistant Examiner